United States Patent [19]

Ohyama et al.

[11] Patent Number: 5,680,484
[45] Date of Patent: Oct. 21, 1997

[54] OPTICAL IMAGE RECONSTRUCTING APPARATUS CAPABLE OF RECONSTRUCTING OPTICAL THREE-DIMENSIONAL IMAGE HAVING EXCELLENT RESOLUTION AND S/N RATIO

[75] Inventors: Nagaaki Ohyama, Yokohama; Susumu Kikuchi, Hachioji; Kazuo Sonobe, Hidaka, all of Japan

[73] Assignee: Olympus Optical Co., Ltd., Tokyo, Japan

[21] Appl. No.: 773,221

[22] Filed: Dec. 23, 1996

Related U.S. Application Data

[63] Continuation of Ser. No. 323,503, Oct. 14, 1994, abandoned, which is a continuation of Ser. No. 72,470, Jun. 4, 1993, abandoned.

[30] Foreign Application Priority Data

Jun. 9, 1992 [JP] Japan .................................. 4-149672

[51] Int. Cl.$^6$ ........................................................ G06K 9/40
[52] U.S. Cl. .................. 382/255; 250/201.3; 364/413.19; 382/108; 382/296
[58] Field of Search ................................ 382/255, 296, 382/131, 108, 151, 154; 364/525, 413.19; 395/125; 356/138

[56] References Cited

U.S. PATENT DOCUMENTS

| | | | |
|---|---|---|---|
| 4,331,877 | 5/1982 | Barrett et al. | 250/445 |
| 4,360,885 | 11/1982 | Edgar | 382/6 |
| 4,891,829 | 1/1990 | Deckman et al. | 364/413.19 |
| 4,985,856 | 1/1991 | Kaufman et al. | 395/124 |
| 5,055,926 | 10/1991 | Christensen et al. | 382/107 |
| 5,094,538 | 3/1992 | Reedman et al. | 364/561 |
| 5,148,502 | 9/1992 | Tsujiuchi et al. | 382/255 |
| 5,159,446 | 10/1992 | Hibino et al. | 358/98 |
| 5,243,665 | 9/1993 | Maney et al. | 382/154 |
| 5,280,542 | 1/1994 | Ozeki et al. | 382/154 |
| 5,390,108 | 2/1995 | Baldur et al. | 382/108 |
| 5,392,211 | 2/1995 | Oe | 382/154 |

FOREIGN PATENT DOCUMENTS

3-12524  1/1991  Japan .

*Primary Examiner*—Michael T. Razavi
*Assistant Examiner*—Jayanti K. Patel
*Attorney, Agent, or Firm*—Frishauf, Holtz, Goodman, Langer & Chick

[57] ABSTRACT

An optical image reconstructing apparatus includes an optical image forming system. A focused surface controller moves the position of an object surface focused by the optical image forming system. An image pickup converts an image of an object formed by the optical image forming system into an electrical signal and outputs the electrical signal as an image signal. An adder adds a plurality of image signals output from the image pickup while the position of the object surface is moved by the focused surface controller. A frequency filtering device performs a frequency filtering operation on an image signal outputted from the adder to produce a filtered image signal. A rotation controller rotates the object or the optical image forming system at a predetermined angular interval around one point on an optical axis of the optical image forming system. An image synthesizing device performs interpolation on a plurality of filtered image signals output from the frequency filtering device while the object or the optical image forming system is rotated at the predetermined angular interval by the rotation controller, to synthesize images in a surface direction parallel to a rotation control surface of the rotation controller, thereby preparing a reconstructed three-dimensional image.

14 Claims, 5 Drawing Sheets

OPTICAL IMAGE RECONSTRUCTING APPARATUS CAPABLE OF RECONSTRUCTING OPTICAL THREE-DIMENSIONAL IMAGE HAVING EXCELLENT RESOLUTION AND S/N RATIO

This application is a Continuation of application Ser. No. 08/323,503, filed Oct. 14, 1994, which is a Continuation of application Ser. No. 08/072,470, filed Jun. 4, 1993 (both now abandoned).

BACKGROUND OF THE INVENTION

1. Field of the Invention

The present invention relates to a technique for reconstructing and displaying a cross-sectional image and a three-dimensional image through digital processing in an image input processing apparatus based on an optical device, such as a microscope, or a viewing apparatus based on various light-emitting phenomena.

2. Description of the Related Art

Figure 9:
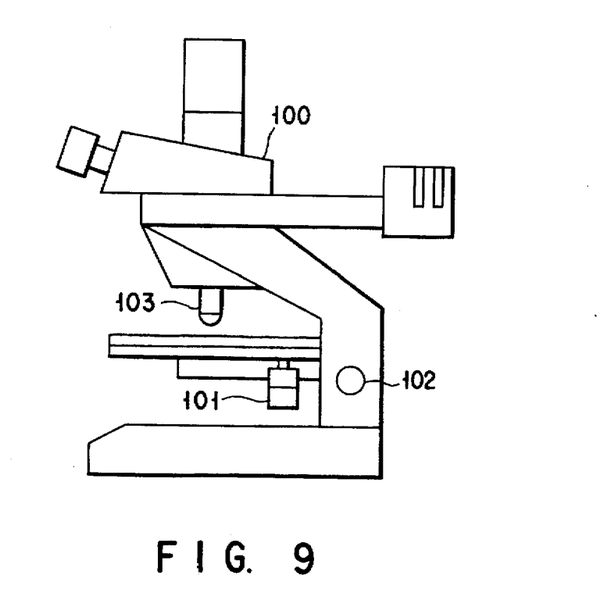
FIG. 9 is a diagram showing the structure of a typical microscope.

A conventional image input processing apparatus based on an optical device may have difficulty in inputting an image from an arbitrary or desired direction due to structural restrictions. Let us consider a microscope as an example of such an apparatus. FIG. 9 illustrates the structure of an ordinary microscope. In general, a microscope is designed to form the image of an object placed on a stage surface normal to the direction of the optical axis of the optical system. As shown in FIG. 9, while an arbitrary portion of the object can be set in the field of view by an X-Y stage driver 101 with respect to the direction normal to the optical axis of an objective lens 103 or the horizontal direction, a Z stage driver 102 in the optical axial direction is used for focus adjustment so that a cross-sectional image in the optical axial direction cannot be obtained in the normal observation method. An example of image reconstruction of a cross-sectional image in the optical axial direction using a digital image processing scheme is given by A. Erhardt, G. Zinser, D. Komitowski and J. Bille, Appl. Opt., 24, 194–200 (1985). This report teaches a method of inputting an image corresponding to a set focused object surface (hereinafter referred to as "focused surface") while shifting the position of the focused surface step by step in the optical axial direction to construct a three-dimensional optical image, and putting this image through an inverse filter of a three-dimensional optical transfer function (3-d OTF) to restore the spatial frequency component which was deteriorated at the time the image was input.

According to this method, however, since the spatial frequency characteristic in the optical axial direction is greatly deteriorated as compared with that in the surface direction due to the limitation of N.A. of the objective lens of the microscope, it is difficult to acquire a cross-sectional image with excellent resolution even through inverse filtering. There is a possibility that at the time the inverse filter is activated, the S/N ratio of the reconstructed image becomes very low by too much emphasis on the spatial frequency component whose 3-d OTF characteristic is deteriorated considerably.

An optical emission CT (optical ECT) is known as a method of acquiring a cross-sectional image of a plasma emission phenomenon in a cylindrical tube, such as a fluorescent lamp or Geissler tube. Particularly, Japanese Unexamined Patent Publication 12524/1991 proposed a method of forming the image of light emission from within a cylindrical tube in a set cross section by using an optical system comprising a slit and a cylindrical lens, and picking up that image with an image sensor such as a CCD camera. This prior art also teaches a method of performing CT image reconstruction through the method of successive approximation in consideration of the ratio of contribution, obtained from an image pattern of individual points on a cross-sectional image formed on the image pickup surface, at the time the image of a cross section is acquired, by a CT image reconstruction method, from images from individual directions obtained by rotating the optical image pickup section in the surface direction of the set cross section. According to this method, however, when the focus depth of the optical image forming system is small with respect to the inside diameter of the target cylindrical tube, the ratio of contribution from those portions out of the focused surface may be distributed in the surface of the picked up image so that projection data necessary for image reconstruction cannot be obtained.

In short, the conventional methods in the field where acquisition of optical cross-sectional images is intended perform image reconstruction using image information, which is obtained within the restriction of the optical characteristics, such as the spatial frequency passband and focus depth of the optical image forming system, and thus have limited resolution and S/N ratio.

SUMMARY OF THE INVENTION

It is therefore an object of the present invention to provide an optical image reconstructing apparatus which can reconstruct an optical cross-sectional image or an optical three-dimensional image having excellent resolution and S/N ratio, and which is practically effective.

To achieve the foregoing and other objects and in accordance with the purpose of the present invention, an optical image reconstructing apparatus according to this invention comprises:

an optical image forming system;

focused surface control means for moving the position of an object surface focused by the optical image forming system;

image pickup means for converting an image of an object formed by the optical image forming system into an electrical signal and outputting the electrical signal as an image signal;

adding means for adding a plurality of image signals output from the image pickup means while the position of the object surface is moved by the focused surface control means;

frequency filtering means for performing a frequency filtering operation on an image signal resulting from addition done by the adding means and outputting a filtered image signal;

rotation control means for rotating the object or the optical image forming system at a predetermined angular interval around one point on an optical axis of the optical image forming system; and image synthesizing means for performing interpolation on a plurality of filtered image signals output from the frequency filtering means while the object or the optical image forming system is rotated at the predetermined angular interval by the rotation control means to synthesize images in a surface direction parallel to a rotation control surface of the rotation control means, thereby preparing a reconstructed image.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 6:
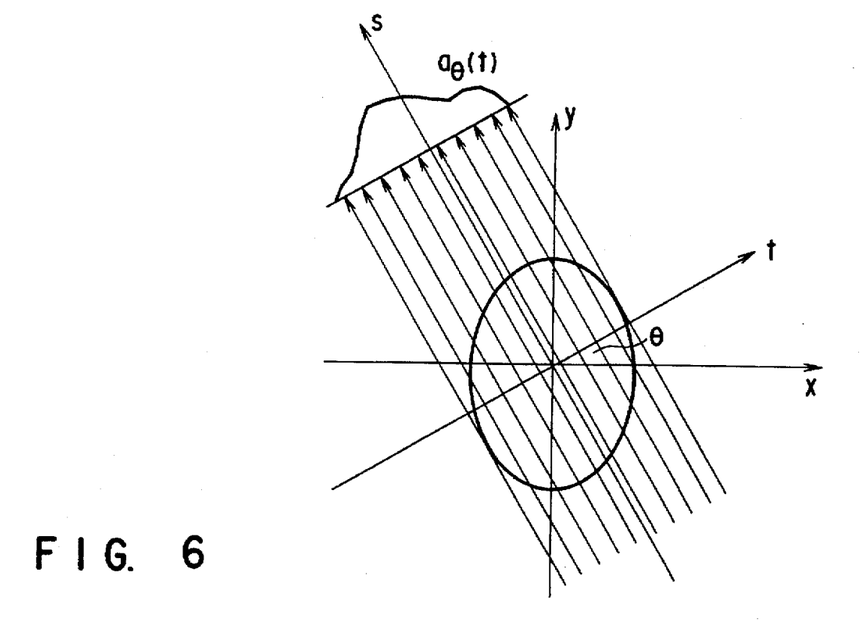
FIG. 6 is a diagram showing the relationship of linear integration with respect to an arbitrary angular direction θ.

Before going to the description of one embodiment of the present invention, the principle of image reconstruction by the linear-integrated projection image which has been employed in X-ray CT, will be described briefly. FIG. 6 illustrates the relationship of linear integration with respect to an arbitrary angular direction θ. A projection pattern $P_\theta(t)$ is expressed by an equation (1). The relationship in the equation (1) is called Radon transform.

$$a_\theta(t) = \int_{ray} f(x,y)ds = \int_{-\infty}^{\infty}\int_{-\infty}^{\infty} f(x,y)\delta(x\cos\theta + y\sin\theta - t)dxdy \quad (1)$$

In actual apparatuses including an X-ray CT apparatus, a projection pattern $a_\theta(t)$ is acquired from the ratio of the intensity of radiation before passing an object to that of radiation after passing it. That is, as the intensity of the incident radiation, $I_{in}$, and the intensity of the radiation passing the object, $I_{out}$, have the relationship given in the equation (2), the projection pattern $a_\theta(t)$ is obtained from an equation (3).

$$I_{out} = I_{in}\exp\left[-\int_{ray} f(x,y)ds\right] \quad (2)$$

$$a(t) = \int_{ray} f(x,y)ds = \ln\frac{I_{in}}{I_{out}} \quad (3)$$

A method of reconstructing a cross-sectional image f(x, y) from the projection pattern $a_\theta(t)$ from multiple directions is derived from the projection theorem which will be illustrated below. The projection theorem says "one-dimensional Fourier transform of projection of f(x, y) in one angular direction equals the center cross-sectional image which is the two-dimensional Fourier transform of f(x, y) cut at the corresponding angle." This is expressed in an equation (4) below.

$$A_\theta(\omega) = \int_{-\infty}^{\infty} a_\theta(t)\exp[-j2\pi\omega t]dt \quad (4)$$
$$= \int_{-\infty}^{\infty}\int_{-\infty}^{\infty} f(x,y)\exp[-j2\pi\omega(x\cos\theta + y\sin\theta)]dxdy$$
$$= \int_{-\infty}^{\infty}\int_{-\infty}^{\infty} f(x,y)\exp[-j2\pi(ux + vy)]dxdy$$

where $A_\theta(\omega)$ is a function of Fourier transformed $a_\theta(t)$, $u=\omega\cos\theta$ and $v=\omega\sin\theta$.

CT reconstruction is accomplished by an algorithm called filter inverse projection which is derived from the relationship between this projection theorem and the coordinate transform between rectangular coordinates and polar coordinates in secondary Fourier transform. That is expressed by the following equations (5) and (6).

$$\hat{f}(x,y) = \int_0^\pi q_\theta(t)d\theta = \int_0^\pi q_\theta(x\cos\theta + y\sin\theta)d\theta \quad (5)$$

$$a_\theta(t) = \int_{-\infty}^{\infty} A_\theta(\omega)|\omega|\exp[j2\pi\omega t]d\omega \quad (6)$$
$$= \int_{-\infty}^{\infty}\left\{\int_{-\infty}^{\infty} a_\theta(t)\exp[-j2\pi\omega t]dt\right\}|\omega|\exp[j2\pi\omega t]d\omega$$

where f(x, y) is an estimated image of f(x, y).

Figure 7:
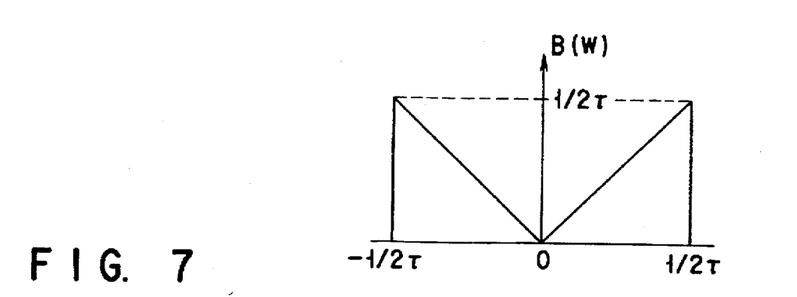
FIG. 7 is a diagram showing a Ramanchandran-Lakshminarayanan weight coefficient.

The filter inverse projection is a method of reconstructing a cross-sectional image by a multidirectional collection of projection patterns from individual angular directions multiplied by a filter (|ω|) which is proportional to the absolute value of the frequency. While a digital image is generally constructed by pixels arranged in a square grating, a CT reconstructed image is obtained by performing interpolation on one-dimensional images of different angular directions. Given that the detection element pitch of a detector for a projection pattern is τ in an actual apparatus, the frequency band W of the projection pattern becomes W=½τ. As a filter in this case, various functions have been proposed. The Ramanchandran-Lakshminarayanan weight coefficient shown in an equation (1) and shown in the diagram of FIG. 7 is a typical one among them.

$$B(\omega) = |\omega|\partial w(\omega) \quad (7)$$

$$\text{where } B(\omega) = \begin{cases} 1|\omega| \leq W \\ 0 \text{ other} \end{cases}$$

Figure 8:
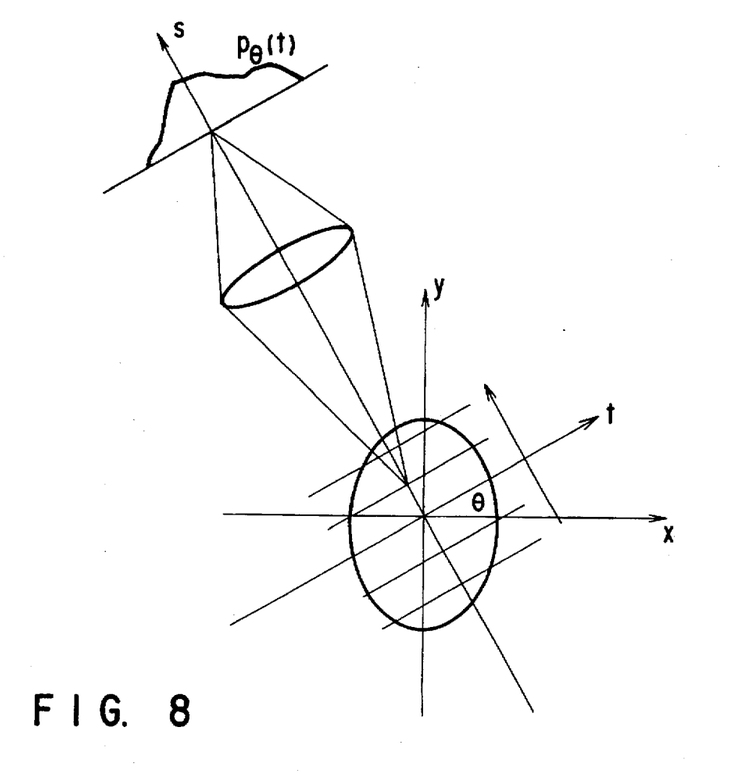
FIG. 8 is a diagram for explaining the principle of image reconstruction according to the present invention.

A description will now be given of the principle of the image reconstruction according to this embodiment. According to this embodiment, a projection pattern is acquired by accumulating images input while the focused surface is moved in the optical axial direction and then multiplying the resultant image by the proper deterioration restoring filter. The operation will be described below. FIG. 8 presents the conceptual diagram of this embodiment. A formed image $g_\theta'(t; s, s_f)$ of an object f(t; s) with the focused surface being set to $s_f$ for a certain angular direction θ is defined in an equation (8).

$$g_\theta'(t,s,s_f) = \int_{-\infty}^{\infty} h_\theta(t-t';s,s_f)f(t',s)dt' \quad (8)$$

$$= \int_{-\infty}^{\infty} h_\theta(t-t';s-s_f)f(t',s)dt'$$

$$\equiv h_\theta(t;s-s_f)*f(t,s)$$

where * is an operator representing convolution concerning t.

An image $g_\theta(t, s)$ obtained by moving the focused surface in the optical axial direction is given by an equation (9).

$$g_\theta(t,s) = \int_\psi g_\theta'(t,s,s_f)ds_f \quad (9)$$

$$= \int_\psi h_\theta(t,s-s_f)*f(t,s)ds_f$$

$$= \int_\psi h_\theta(t,s-s_f)ds_f * f(t,s)$$

$$\equiv h_\theta(t)*f(t,s)$$

where $\psi$ is the moving range of the focused surface.

$$\text{or } h_{a\theta}(t) \equiv h_{a\theta}(t,s) = \int_\psi h_\theta(t,s-s_f)ds_f \quad (10)$$

The equation (10) means that with the moving range $\psi$ set sufficiently larger, the transfer function $h_{a\theta}(t; s)$ becomes constant irrespective of the position of S and can thus be expressed simply by $h_{a\theta}(t)$. A projection image $P_\theta'(t)$ obtained by integration of an image is given in an equation (11).

$$P_\theta'(t) = \int_\psi g_\theta(t,s)ds \quad (11)$$

$$= \int_\psi h_{a\theta}(t)*f(t,s)ds$$

$$= h_{a\theta}(t) * \int_\psi f(t,s)ds$$

Since, from the equation (11), $P_\theta'(t)$ can be considered as a projection image which has been deteriorated through convolution, a true projection image $P_\theta(t)$ is acquired by multiplying $P_\theta'(t)$ by the inverse filter of $h_{a\theta}(t)$, as illustrated in equation (12).

$$P_\theta(t) = h_{a\theta}^{-1}(t)*P_\theta'(t) \quad (12)$$

$$= h_{a\theta}^{-1}(t)*h_{a\theta}(t)* \int_\psi f(t,s)ds$$

$$= \int_\psi f(t,s)ds$$

where $h^{-1}_{a\theta}(t)$ is an inverse filter function of $h_{a\theta}(t)$ and is given by an equation (13).

$$h_{a\theta}^{-1}(t) = F^{-1}\left[\frac{1}{F[h_{a\theta}(t)]}\right] \quad (13)$$

where $F[\cdot]$ is the operator of Fourier transform and $F-1[\cdot]$ is the operator of inverse Fourier transform.

Reconstruction of a cross-sectional image based on the CT principle can be carried out using the projection image $P_\theta(t)$ derived from the equation (12). In other words, the projection image $P_\theta(t)$ by this embodiment can be applied to the filter inverse projection expressed by the equations (5) and (6). Accordingly, $P_\theta(t)$ of the equation (12) is substituted into the projection pattern $a_\theta(t)$ of the equation (6).

$$q_\theta(t) = \int_{-\infty}^{\infty}\left\{\int_{-\infty}^{\infty}P_\theta(t)\exp[-j2\pi\omega t]dt\right\}|\omega|\exp[j2\pi\omega]d\omega \quad (14)$$

$$= F^{-1}[F[P_\theta(t)]|\omega|]$$

$$= F^{-1}[F[h_{a\theta}^{-1}(t)*P_\theta'(t)] \cdot |\omega|]$$

$$= F^{-1}[H_{a\theta}^{-1}(\omega) \cdot F[P_\theta'(t)] \cdot |\omega|]$$

$$\equiv F^{-1}[F[P_\theta'(t)]G(\omega)]$$

where $H_{a\theta}^{-1}(\omega) = F[h_{a\theta}^{-1}(t)]$.

$$G(\omega) \equiv H_{a\theta}^{-1}(\omega) \cdot |\omega| = \frac{|\omega|}{H_{a\theta}(\omega)} \quad (15)$$

where $H_{a\theta}(\omega) = F[h_{a\theta}(t)]$.

From what has been derived above, the subject matter of this embodiment can be said as follows. Images $P_\theta'(t)$ are input through integration of formed images each with its optical axis aligned to a certain angular direction while moving the focused surface over a predetermined range, the input images are filtered with a function $G(\omega)$ expressed by the equation (15), and the filtered images are synthesized for multiple directions to thereby reconstruct a cross-sectional image.

Figure 1:
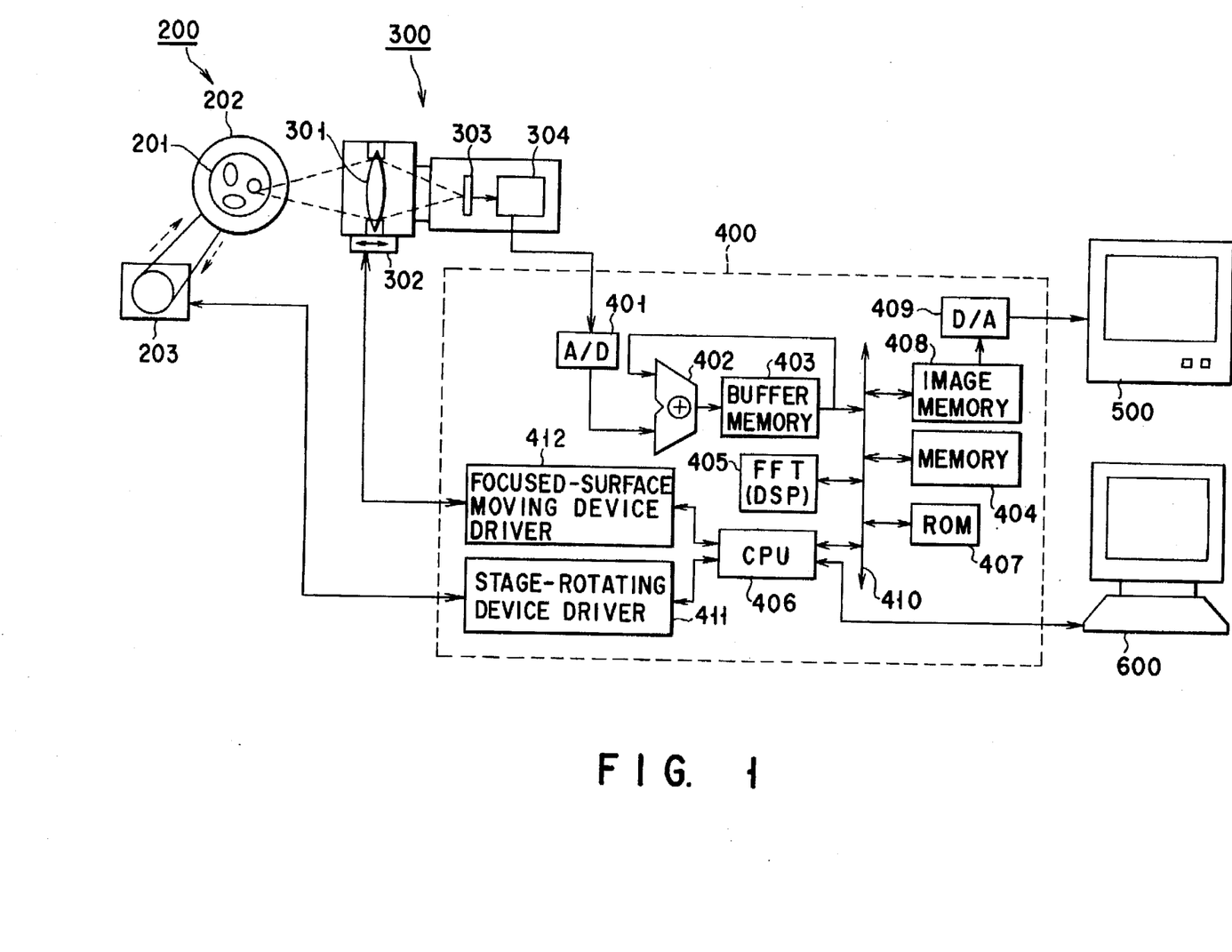
FIG. 1 is a diagram illustrating the structure of a first embodiment of the present invention.

The structure of the first embodiment of the present invention will be described referring to FIG. 1. The structure is mainly separated into a stage 200, an image pickup apparatus 300, an image processor 400, a TV monitor 500 and a man-machine interface 600. The stage 200 comprises a rotary stage 202, which securely holds a sample 201 to be measured, such as various types of light emitting materials, and a stage rotating device 203 for rotating the rotary stage 202. The image pickup apparatus 300 comprises a cylindrical lens 301 as an image forming optical system, a focused surface moving device 302 for moving the position of the cylindrical lens 301 in the optical axial direction to control the focused surface, a line pickup device 303, such as a CCD, which converts the formed optical image into an electrical signal, and a line signal processor 304 for amplifying the signal from the line pickup device 303 and outputting the amplified signal as the proper train of signals. The image processor 400 includes an A/D converter 401 for converting the the signal from the image pickup apparatus 300 into a digital signal, an adder 402 for adding digital signals and a buffer memory 403 for accumulative storage of the digital line signals. A memory 404 for storing a plurality of digital line signals, an FFT operation unit (DSP) 405, a CPU 406, a ROM 407 where filter coefficients are recorded, and an image memory 408 are all connected to an internal bus 410, so that image reconstruction is executed based on an instruction signal from the CPU 406. A reconstructed image recorded in the image memory 408 is converted into a predetermined analog video signal by a video D/A converter 409, and this video signal is displayed on the TV monitor 500. The image processor 400 incorporates a stage-rotating device driver 411 for controlling the stage rotating device 203 and a focused-surface moving device driver 412 for controlling the focused surface moving device 302, and sends out control signals to the respective driving devices based on instruction signals from the CPU 406. The man-machine interface 600 is connected to the CPU 406 and is designed so that setting conditions are displayed and an operator can send an operation instruction.

The function of the above structure will be described below.

With the rotary stage 202 fixed to a certain set angle with respect to the image pickup apparatus 300, images of an object are picked up while moving the focused surface of the cylindrical lens 301 over a range where the region of the sample present is completely included, and are accumulated in the image processor 400. In this operation, the focused surface of the cylindrical lens 301 may be moved step by step at a predetermined interval or may be moved continuously. This operation is repeated until one turn is made while changing the set angle of the rotary stage 202 at a predetermined interval, so that images accumulated in multiple directions are recorded in the memory 404. Predetermined filtering is performed on the individual line signals recorded in the memory 404 by the FFT operation unit 405 and CPU 406, based on filter coefficients, given by the equation (15) and stored in the ROM 407. The CPU 406 performs interpolation using the filtered line signals, and a reconstructed image is recorded in the image memory 408.

According to the first embodiment, as described above, the use of the cylindrical lens permits projection images of a set cross section of a sample to be efficiently input, the line signals input and with the focused surface set to different positions are accumulated, thus allowing signals with a good S/N ratio to be input.

The image pickup apparatus 300 and the adder 402 may be combined into a single unit.

A second embodiment of the present invention will now be described below.

Figure 2:
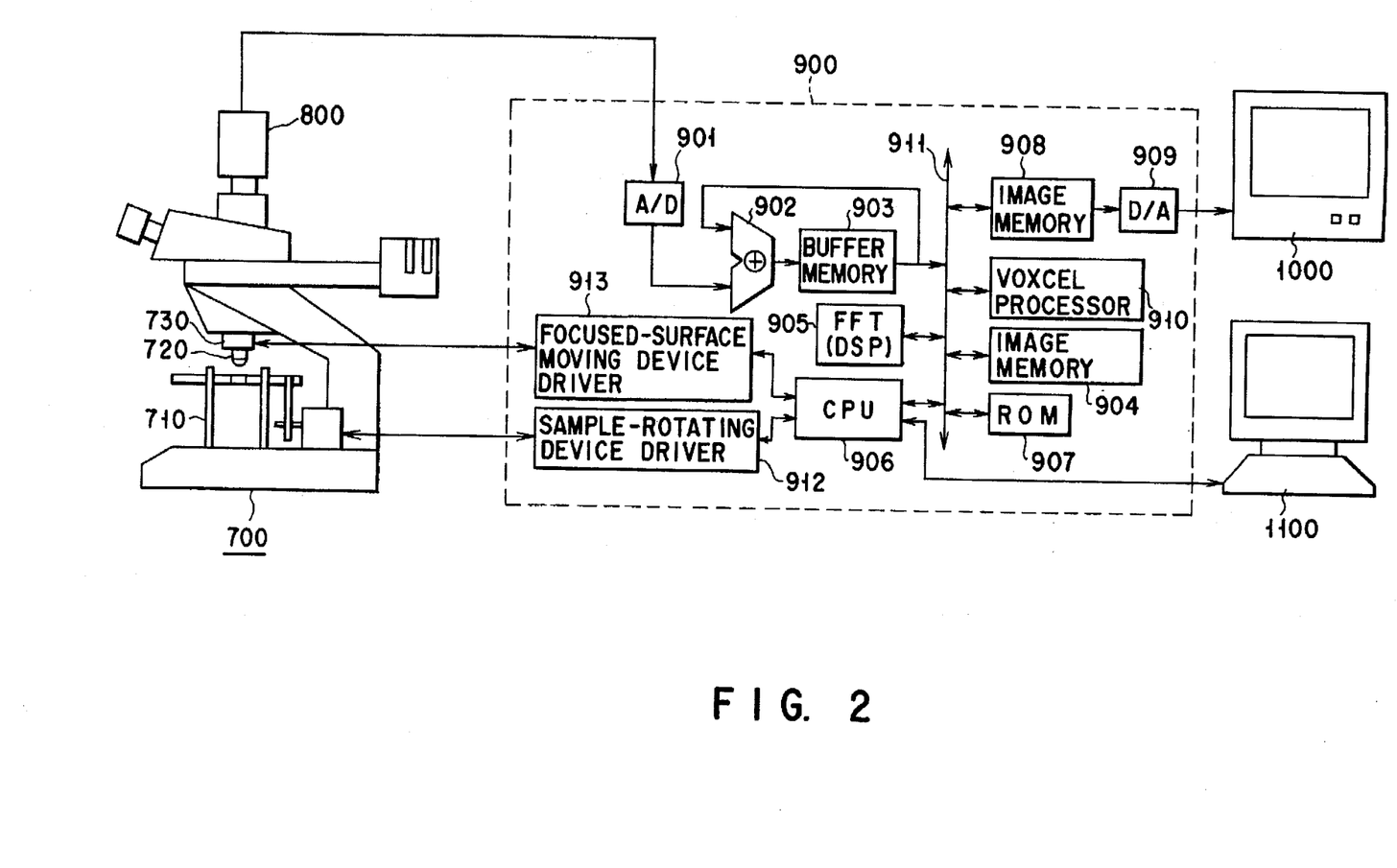
FIG. 2 is a diagram illustrating the structure of a second embodiment of the present invention as adapted for an optical microscope.

According to this embodiment, the present invention is adapted for an optical microscope whose structure is illustrated in FIG. 2. This structure is mainly separated into a microscope device 700, a TV camera 800, an image processor 900, a TV monitor 1000 and a man-machine interface 1100. The microscope device 700 is provided with a sample rotating device 710 which can rotate a sample while holding it. An objective lens 720 is designed to be driven in the optical axial direction by a focused surface moving device 730, so that the focused surface of the objective lens 720 is set to a predetermined object surface in the optical axial direction.

Figure 3:
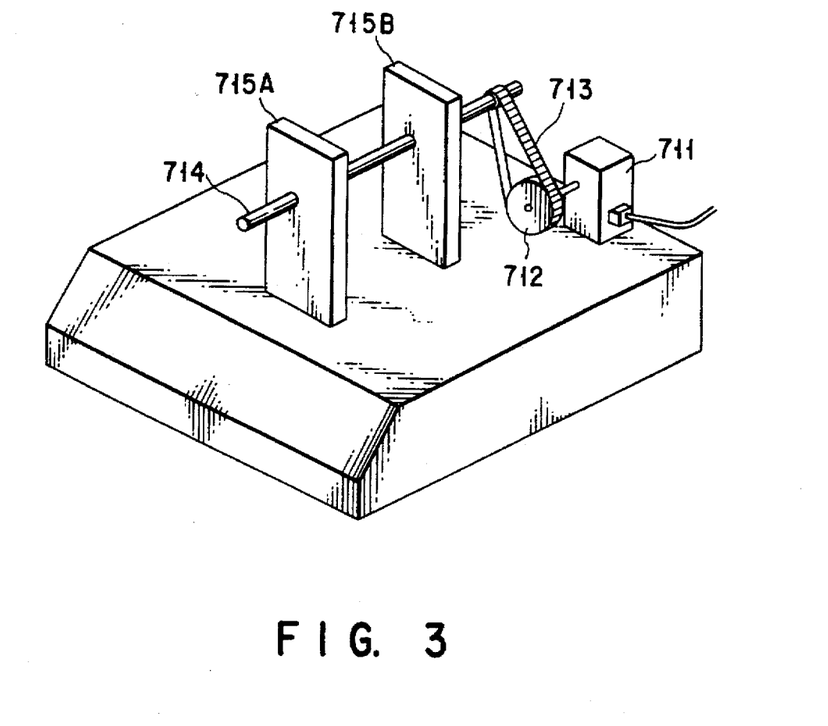
FIG. 3 is a diagram showing the detailed structure of a sample rotating device shown in FIG. 2.

FIG. 3 presents a detailed illustration of the sample rotating device 710. A pulley 712 is rotated by a motor 711, and the driving power is transmitted over a belt 713 to a transparent tube 714. The transparent tube 714 is filled with a liquid, such as isotonic sodium chloride solution or alcohol, where a sample like a living tissue or a living cell is held. The transparent tube 714 is so disposed as to be also rotatable while being supported by holding stages 715A and 715B. The structure in FIG. 2 excluding the microscope device 700 will now be described. The TV camera 800 is mounted on the tip of the cylinder portion of the microscope device 700 to pick up a microscope image. The image processor 900 includes an A/D converter 901 for converting the video signal from the TV camera 800 into a digital signal, an adder 902 for adding digital signals and a buffer memory 903 for accumulative storage of digital image signals. An image memory 904 for storing a plurality of digital image signals, an FFT operation unit (DSP) 905, a CPU 906, a ROM 907, an image memory 908 and a voxel processor 910 are connected to an internal bus 911. Accordingly, reconstruction of a three-dimensional image is executed based on an instruction signal from the CPU 906, and a predetermined two-dimensional projection image is computed from the three-dimensional image by the voxel processor 910 and is stored in the image memory 908. The image recorded in the image memory 908 is converted into a predetermined analog video signal by a video D/A converter 909, and this video signal is displayed on the TV monitor 1000. The image processor 900 incorporates a sample-rotating device driver 912 for controlling the sample rotating device 710 and a focused-surface moving device driver 913 for controlling the focused surface moving device 730, and sends out control signals to the respective driving devices based on instruction signals from the CPU 906. The man-machine interface 1100 is designed in the same manner as the man-machine interface 600 of the first embodiment.

The function of the above structure will be described below.

The function is basically the same as that of the first embodiment. While a two-dimensional cross-sectional image is reconstructed from a one-dimensional projection image in the first embodiment, a three-dimensional image is reconstructed from a two-dimensional projection image in the second embodiment. The processing is performed in the following manner. First, images of an object, which have been picked up while moving the focused surface of the objective lens 720 over a range where the transparent tube 714 from the top to the bottom is completely included, are accumulated in the image processor 900 and stored in the image memory 904. This operation is repeated until one turn is made while changing the set angle of the transparent tube 714 with respect to the optical axis of the objective lens 720 at a predetermined interval, so that images accumulated in multiple directions are recorded in the image memory 904. The individual images recorded in the memory 904 are filtered by the CPU 906 based on the coefficients stored in the ROM 907. Those images are then subjected to interpolation to reconstruct a three-dimensional image. The result is stored again in the image memory 904. The three-dimensional image recorded in this memory 904 is processed by the voxel processor 910 so that it can be viewed on the TV monitor 1000. In other words, the three-dimensional image is transformed into a projection image as viewed from a predetermined point of view, a predetermined slice image is constructed, or a surface with the same predetermined density is constructed to transform the three-dimensional image into a viewable two dimensional projection image which is easily grasped when displayed.

Figure 4:
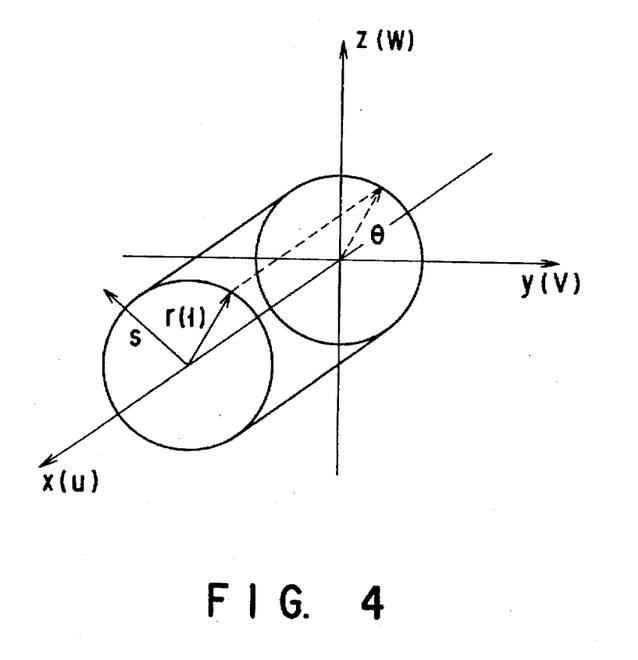
FIG. 4 is a diagram illustrating a system for rotating an object around an x axis in three-dimensional space expressed by three orthogonal axes x, y and z.

The theory in the case where the principle of the present invention is applied to reconstruction of a three-dimensional image will be described below. Let us consider a system for rotating an object around an x axis in three-dimensional space expressed by three orthogonal axes x, y and z, as shown in FIG. 4. In this case, a projection image is detected by a surface parallel to the x axis. Given that the two-dimensional coordinates on a projection surface at a given set angle θ is t=(x, y), the equations (8) to (13) are expressed by the following equations (16) to (21).

$$g_\theta'(t,s,s_f) = \int_{-\infty}^{\infty} h_\theta(t-t';s-s_f)f(t';s)dt' \qquad (16)$$

$$= \int_{-\infty}^{\infty}\int_{-\infty}^{\infty} h_\theta(x-x',r-r';s-s_f)f(x',r';s)dx'dr'$$

$$\equiv h_\theta(t;s-s_f)*f(t;s)$$

where * is the operator of three-dimensional convolution concerning t.

$$g_\theta(t;s) = \int_\psi g_\theta'(t;s,s_f)ds_f \tag{17}$$

$$\equiv h_\theta(t)*f(t;s) \tag{18}$$

$$h_{a\theta}(t) \equiv h_{a\theta}(t;s) = \int_\psi h_\theta(t;s-s_f)ds_f \tag{19}$$

$$P_\theta'(t) = \int_\psi g_\theta(t;s)ds \tag{}$$

$$= h_{a\theta}(t) * \int_\psi f(t;s)ds$$

$$P_\theta(t) = h_{a\theta}^{-1}(t) * P_\theta'(t) \tag{20}$$

$$= \int_\psi f(t;s)ds$$

$$h_{a\theta}^{-1}(t) F^{-1}\left[\frac{1}{F[h_{a\theta}(t)]}\right] \tag{21}$$

where F[•] is the operator of two-dimensional Fourier transform and $F^{-1}$[•] is the operator of two-dimensional inverse Fourier transform.

Filter inverse projection for reconstruction of a three-dimensional image is expressed by the following equations (22) and (23).

$$\hat{f}(x,y,z) = \int_0^\pi q_\theta(t)d\theta \tag{22}$$

$$= \int_0^\pi q_\theta(x,r)d\theta$$

$$= \int_0^\pi q_\theta(x, y\cos\theta + z\sin\theta)d\theta$$

$$q_\theta(t) = \int_{-\infty}^\infty A_\theta(\omega)|\omega|\exp[j2\pi\omega t]d\omega \tag{23}$$

$$= \int_{-\infty}^\infty \int_{-\infty}^\infty A_\theta(u,l)|l|\exp[j2\pi(xu+lr)]dudl$$

where $\omega$ is defined to be $\omega=(u, l)$ as shown in spatial frequency coordinates in FIG. 4.

Substituting projection pattern $P_\theta(t)$ of the equation (20) into the equation (23) yields the following equation (24).

$$q_\theta(t) = \int_{-\infty}^\infty \left\{\int_{-\infty}^\infty P_\theta(t)\exp[-j2\pi\omega t]dt\right\} |l|\exp[j2\pi\omega t]d\omega \tag{24}$$

$$= F^{-1}[F[P_\theta(t)] \cdot |l|]$$

$$= F^{-1}[F[P_\theta'(t)] \cdot G(\omega)]$$

where $$G(\omega) \equiv F[h_{a\theta}^{-1}(t)] \cdot |l| = \frac{|l|}{H_{a\theta}^{-1}(\omega)} = \frac{|l|}{H_{a\theta}^{-1}(u,l)} \tag{25}$$

Figure 5:
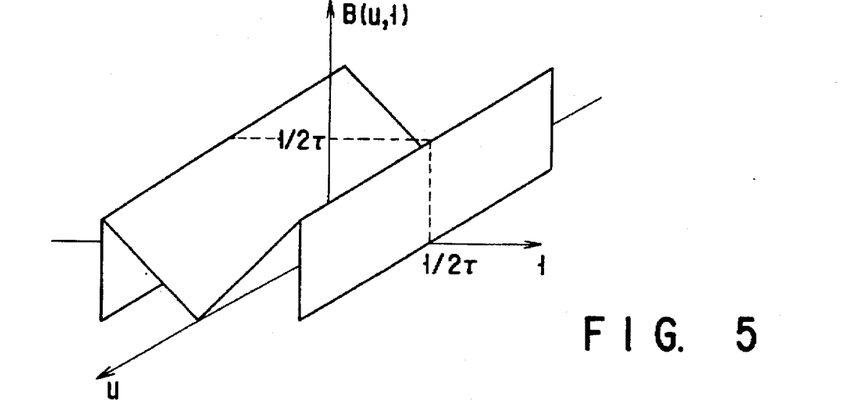
FIG. 5 is a diagram showing the shape of a filter corresponding to a Ramanchandran-Lakshminarayanan weight coefficient.

When the band in the direction perpendicular to the transparent tube 714 of the image pickup device in the TV camera 800 is W=½τ, a filter corresponding to the Ramanchandran-Lakshminarayanan weight coefficient given in the equation (7) is given in the following equation (26) and has a shape as shown in FIG. 5.

$$B(\omega) = B(u,l) = |l| \partial_w(l) \tag{26}$$

where $$\partial_w(l) = \begin{cases} 1 & |l| \leq W \\ 0 & \text{other} \end{cases} \tag{26}$$

In short, according to the second embodiment, an optical device like a microscope which is normally difficult to provide a cross-sectional image in the optical axial direction is allowed to reconstruct a cross-sectional image with excellent resolution, and reconstruction of a three-dimensional optical image can be accomplished relatively easily by constructing a projection image with an image sensor.

As described above in detail, the present invention uses means for inputting projection images through integration of formed images while moving the focused surface over a predetermined range and performing the proper deterioration restoring filtering. This design permits the focus depth to substantially increase while keeping the resolution. An apparatus also effective to improve the S/N ratio can be accomplished by properly setting the moving range of the focused surface with respect to an object and adjusting the deterioration restoring filter so that it does not emphasize the high-frequency noise component too much.

The present invention therefore can provide an optical image reconstructing apparatus which can reconstruct an optical cross-sectional image or an optical three-dimensional image having excellent resolution and S/N ratio and is practically effective.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical image reconstructing apparatus comprising:

an optical image forming system having an optical axis, said optical image forming system forming a cross sectional image of an object in an object space onto an image formation surface in an image space, the cross-sectional image having a plane substantially parallel to the optical axis;

rotation control means for successively rotating said object at a predetermined angular interval about an axis which intersects a point on said optical axis of said optical image forming system, said rotation of said object being in a rotation control surface in said object space;

focused surface control means for moving the optical image forming system along said optical axis of the optical image forming system to focus a plurality of cross sectional images of said object in said object space successively onto said image formation surface, while said object is at a given fixed rotational position, and for repeating said moving of said optical image forming system along said optical axis at successive different fixed rotational positions of said object;

image pickup means for converting the successively focussed cross sectional images of said object when said object is at said given fixed rotational position in said object space, said successively focussed cross sectional images being formed by said optical image forming system at a plurality of positions of the optical image forming system along said optical axis, into respective electrical image signals, and for outputting said respective electrical image signals;

adding means for adding a plurality of said electrical image signals corresponding to a respective plurality of focussed cross sectional images of said object, obtained while the optical image forming system is moved along said optical axis of the optical image forming system by said focused surface control means, and for outputting a sum image signal corresponding to the sum of said added plurality of electrical image signals;

frequency filtering means for performing a frequency filtering operation on the sum image signal which is output from said adding means, and for outputting a filtered sum image signal; and image synthesizing means for performing interpolation on a plurality of filtered sum image signals output from said frequency filtering means at successive rotational positions of said object which is rotated at said predetermined angular interval by said rotation control means, to synthesize images in a surface direction parallel to said rotation control surface, and for thereby synthesizing a reconstructed image.

2. The optical image reconstructing apparatus according to claim 1, wherein said frequency filtering means includes:

a frequency filter for performing said frequency filtering operation to restore a frequency component which has been deteriorated by said adding of said image signals; and a compensation filter for reconstructing a cross-sectional image obtained by said image pickup means.

3. The optical image reconstructing apparatus according to claim 1, wherein said image pickup means and said adding means comprise a single unit.

4. The optical image reconstructing apparatus according to claim 1, wherein:

said image pickup means includes an image sensor; and said image synthesizing means includes means for simultaneously acquiring a plurality of cross-sectional images to reconstruct a three-dimensional image.

5. The optical image reconstructing apparatus according to claim 1, wherein said image pickup means includes:

a cylindrical lens as an image forming optical system;

a focused-surface moving device for moving the position of said cylindrical lens in an optical axis direction to control a position of a focal plane in said object space;

a line pickup device for converting a formed optical image into an electrical signal; and a line signal processor for amplifying said electrical signal from said line pickup device and for outputting said amplified electrical signal as a train of signals.

6. The optical image reconstructing apparatus according to claim 1, further comprising:

an image memory for storing an image reconstructed by said image synthesizing means; and display means for displaying said reconstructed image stored in said image memory.

7. The optical image reconstructing apparatus according to claim 1, further comprising interface means for coupling an externally supplied operation instruction to said optical image reconstructing apparatus.

8. The optical image reconstructing apparatus according to claim 1, wherein said image pickup means includes a TV camera.

9. The optical image reconstructing apparatus according to claim 1, wherein said rotation control means comprises:

a rotary stage for holding said object; and driving means coupled to said rotary stage for rotating said rotary stage at said predetermined angular intervals.

10. The optical image reconstructing apparatus according to claim 1, wherein said rotation control means includes:

a rotatable transparent tube for holding said object, said rotatable transparent tube having a longitudinal axis;

a holding stage for rotatably supporting said rotatable transparent tube;

a motor having a rotatable member; and transfer means for transferring rotation from said rotatable member of said motor to said rotatable transparent tube for rotating said rotatable transparent tube about its longitudinal axis.

11. The optical image reconstructing apparatus according to claim 4, further comprising a voxel processor for computing, from said three-dimensional image synthesized by said image synthesizing means, a corresponding two-dimensional projection image.

12. An optical image reconstructing apparatus according to claim 1, wherein said frequency filtering means includes means for preventing an image quality degradation which is due to accumulation of images different in focal position.

13. An optical image reconstructing apparatus according to claim 1, wherein said frequency filtering means includes means for enabling correction of errors caused by conversion from polar coordinates to rectangular Cartesian coordinates, so as to realize filtered back-projection.

14. An optical image reconstructing apparatus according to claim 1, wherein said image synthesizing means comprises:

means for rotating, when the filtered sum image signals are generated, the reconstructed image which is synthesized by interpolation, so that the direction of said optical axis of the optical image forming system which is set by the rotation means corresponds to a direction of back projection; and means for adding a respective pixel value to each of the corresponding filtered sum image signals parallel with the back projection direction of the cross sectional image.

* * * * *